(12) United States Patent
Merienne

(10) Patent No.: US 9,847,743 B2
(45) Date of Patent: Dec. 19, 2017

(54) METHOD FOR CONTROLLING A POWER TRAIN AND CORRESPONDING SYSTEM

(71) Applicant: RENAULT s.a.s., Boulogne-Billancourt (FR)

(72) Inventor: Ludovic Merienne, Gif-sur-Yvette (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/412,548

(22) PCT Filed: Jul. 3, 2013

(86) PCT No.: PCT/FR2013/051570
§ 371 (c)(1),
(2) Date: Jan. 2, 2015

(87) PCT Pub. No.: WO2014/006329
PCT Pub. Date: Jan. 9, 2014

(65) Prior Publication Data
US 2015/0155811 A1  Jun. 4, 2015

Related U.S. Application Data

(60) Provisional application No. 61/672,426, filed on Jul. 17, 2012.

(30) Foreign Application Priority Data

Jul. 3, 2012  (FR) ...................................... 12 56368

(51) Int. Cl.
*H02P 21/00* (2016.01)
*B60L 3/00* (2006.01)
(Continued)

(52) U.S. Cl.
CPC ........ *H02P 21/0035* (2013.01); *B60L 3/0038* (2013.01); *B60L 11/1803* (2013.01);
(Continued)

(58) Field of Classification Search
CPC ...... A61N 2/006; A61N 1/36014; A61N 2/02; H02P 21/13; H02P 21/12; H02P 9/302
(Continued)

(56) References Cited

U.S. PATENT DOCUMENTS 5,115,174 A    5/1992  Masuda et al.
2003/0085678 A1*  5/2003  Yamada ................. H02P 21/22
                                                                318/400.02
(Continued)

FOREIGN PATENT DOCUMENTS

EP    1 311 060 A2    5/2003
EP    2 043 253 A2    4/2009
(Continued)

OTHER PUBLICATIONS

International Search Report dated Jun. 18, 2014 in PCT/FR2013/051570.
(Continued)

*Primary Examiner* — Eduardo Colon Santana
*Assistant Examiner* — Gabriel Agared
(74) *Attorney, Agent, or Firm* — Oblon, McClelland, Maier & Neustadt, L.L.P.

(57) ABSTRACT

A method for controlling a power train and corresponding system. A method for controlling a power train equipping a motor vehicle and comprising an electric motor provided with a rotor and a stator, said method comprising the regulation of the currents of the rotor and the stator delivering control signals to the electric motor, said currents to be regulated and said control signals being expressed in a rotating reference system and comprising a plurality of axes.
(Continued)

The method includes a measurement of the values of the currents of the rotor and the stator, a transformation of said measurements into said rotating reference system, a determination of minimum and maximum limits for each of the currents on the basis of said control signals, and a comparison of the measured signals with said minimum and maximum limits.

10 Claims, 2 Drawing Sheets

(51) Int. Cl.
  *H02P 21/14* (2016.01)
  *B60L 11/18* (2006.01)
  *B60L 15/02* (2006.01)
  *H02P 21/22* (2016.01)

(52) U.S. Cl.
  CPC .......... *B60L 15/025* (2013.01); *H02P 21/14* (2013.01); *H02P 21/22* (2016.02); *B60L 2220/14* (2013.01); *B60L 2240/421* (2013.01); *B60L 2240/425* (2013.01); *B60L 2240/429* (2013.01); *Y02T 10/643* (2013.01); *Y02T 10/7005* (2013.01)

(58) Field of Classification Search
  USPC .................................................. 318/400.02
  See application file for complete search history.

(56) References Cited

U.S. PATENT DOCUMENTS

| | | | |
|---|---|---|---|
| 2004/0257011 A1* | 12/2004 | Rechberger | H02P 9/006 318/139 |
| 2006/0012329 A1 | 1/2006 | Aoki et al. | |
| 2006/0176059 A1* | 8/2006 | Mir | G01R 31/343 324/503 |
| 2007/0040524 A1* | 2/2007 | Sarlioglu | H02P 21/0089 318/438 |
| 2007/0046246 A1* | 3/2007 | Borisavljevic | H02P 6/20 318/723 |
| 2007/0064359 A1 | 3/2007 | Shima | |
| 2008/0116835 A1* | 5/2008 | Tsui | H02P 8/32 318/615 |
| 2009/0021196 A1* | 1/2009 | Peyras | H02P 21/06 318/400.02 |
| 2009/0071735 A1 | 3/2009 | Kaneko et al. | |
| 2009/0079373 A1 | 3/2009 | Nagase et al. | |
| 2010/0090629 A1* | 4/2010 | Tang | B60L 15/025 318/400.09 |
| 2012/0217911 A1* | 8/2012 | Wu | H02P 27/085 318/400.3 |

FOREIGN PATENT DOCUMENTS

| | | |
|---|---|---|
| JP | 2003-319684 A | 11/2003 |
| JP | 2004-320945 A | 11/2004 |
| WO | WO 2007/007387 A1 | 1/2007 |

OTHER PUBLICATIONS

Vasile Coroban-Schramel, et al., "Active-Flux-Based Motion-Sensorless Vector Control of Biaxial Excitation Generator/Motor for Automobiles" IEEE Transactions on Industry Applications, vol. 47, No. 2, XP011363478, 2011, pp. 812-819.

* cited by examiner

METHOD FOR CONTROLLING A POWER TRAIN AND CORRESPONDING SYSTEM

BACKGROUND

The invention relates to the control of electric motors, and in particular the control of electric motors of wound-rotor synchronous type.

An electric motor of wound-rotor synchronous type comprises a fixed part known as the stator and a moving part known as the rotor. The stator comprises three coils offset by 120 and powered with alternating current. The rotor comprises one coil powered with direct current. The phase currents of the stator depend on the resistances and inductances of the rotor and the stator as well as the mutual inductance between the rotor and the stator.

Conventionally, control signals are used to control the currents of the stator and the rotor. In this way regulation is implemented which depends on the measured values of the currents.

If one of the sensors supplying these measured values is faulty, for example constantly indicating a zero current value, the regulation will increase the value of the control signals in order to increase that of the current. Due to this, the value of the control signals can diverge until maximum values are reached, which causes the appearance of particularly high, or even destructive currents. By way of example, it is possible to reach control signal values of up to 400 Volts which cause the appearance of currents of up to 40 000 Amps. Of course, such currents are destructive for the transistors used for control, for example Insulated Gate Bipolar Transistors (IGBT).

Note that the Japanese patent application JP 2001 268980 and the U.S. Pat. No. 5,047,699 have proposed the regulation of direct currents by means of an electrical machine model.

The reader is also referred to the document US 2002 0008492 which describes a method for detecting sensor faults.

BRIEF SUMMARY

An aim of the present invention is to improve the regulation of an electric motor, notably in the event of a sensor fault.

According to a mode of implementation, a method is proposed for controlling a power train equipping a motor vehicle and comprising an electric motor equipped with a rotor and a stator, said method comprising a regulation of the currents of the rotor and the stator conveying control signals to the electric motor, said currents to be regulated and said control signals being expressed in a rotating frame of reference comprising a plurality of axes, for example the Park frame of reference.

According to a general feature, the method comprises a measurement of the values of the currents of the rotor and the stator, for example supplied by a set of sensors, a transformation of these measurements into said rotating frame of reference, a determination of minimum and maximum bounds for each of the currents as a function of said control signals, and a comparison of the measured signals with said minimum and maximum bounds.

Minimum and maximum bounds are thus determined, independently of the measured values which can be false in the event of sensor faults. These bounds in particular indicate the range in which the current must lie when the control signals are applied. If during the comparison the measured signals are outside the bounds, it may then be considered that one or more sensors are faulty and that it is preferable to limit the use of the motor. Safer operation and improved regulation are therefore obtained.

The determination of the minimum and maximum bounds can be implemented by means of a model of the motor. This model can comprise a set of equations linking the control signals to the currents. These equations apply to the control signals and to the currents projected into the Park frame of reference, and they can depend on parameters such as the values of the resistances and inductance in the Park frame of reference, the mutual inductance values or else the frequency of the sinusoidal electrical signals.

The method can comprise, prior to the step of determining the minimum and maximum bounds, the solving of equations of the model of the motor in steady state comprising a calibration step.

In steady state, equations of the first order, and which are easier to solve, are obtained between the currents and the control signals. After calibration steps, it is possible to determine all the parameters of the equations and in particular their minimum and maximum values to obtain said minimum and maximum bounds for each of the currents (which only depend on the control signals).

In a variant, the method can comprise, prior to the step of determining the minimum and maximum bounds, a determination of transfer functions setting the current values for each control signal and a determination of functions enveloping said transfer functions depending on parameters, said parameters being determined by calibration.

Said functions enveloping the transfer functions make it possible to give minimum and maximum bounds to the current values which depend in particular on the electrical frequency. A better determination is thus obtained compared to the preceding variant, which was in steady state.

According to an embodiment, a system is proposed for controlling a power train equipping a motor vehicle and comprising an electric motor equipped with a rotor and a stator, means for regulating the currents of the rotor and the stator conveying control signals to the electric motor, said currents to be regulated and said control signals being expressed in a rotating frame of reference comprising a plurality of axes.

According to a general feature, the system comprises means for measuring the values of the currents of the rotor and the stator, means for transforming these measurements into said rotating frame of reference, means for determining minimum and maximum bounds for each of the currents as a function of said control signals, and means for comparing the measured signals with said minimum and maximum bounds.

The means for determining the minimum and maximum bounds can comprise a model of the motor.

The system can comprise means for solving a set of equations of the model in steady state.

In a variant, the system can comprise means for determining transfer functions setting the current values for each control signal and means for determining functions enveloping said transfer functions depending on parameters.

BRIEF DESCRIPTION OF THE DRAWINGS

Other aims, features and advantages will become apparent on reading the following description, given solely by way of non-limiting example and made with reference to the appended drawings, wherein.

DETAILED DESCRIPTION

Figure 1:
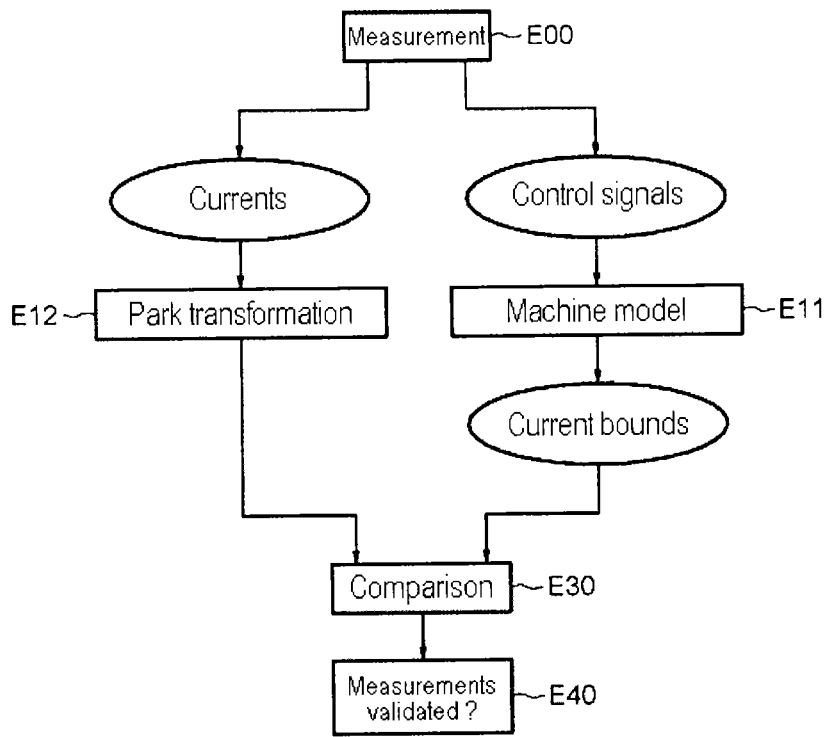
FIG. 1 illustrates the steps of a method for controlling an electric power train according to the invention.

FIG. 1 schematically represents the steps of implementation of a method for controlling a power train equipping a motor vehicle and comprising an electric motor. The method comprises a first step of measuring the currents flowing in the rotor and in the stator (step E00), which makes it possible to obtain on the one hand the values of the currents, and on the other hand the control signals, i.e. the voltages applied to obtain these currents. It is possible to formulate the minimum and maximum bounds of current values by means of the control signals (step E11), for example by means of a model of the motor or of the electric machine. It is furthermore possible to apply a Park transformation to the measured currents (step E12). Finally, in a comparison step E30, a check is carried out to ensure that the measured and transformed values are within the bounds. If they are (step E40), it is possible to estimate that there is no fault in the sensors and that regulation can be continued, otherwise regulation can be limited in such a way as to protect the motor and increase safety.

The obtaining of the bounds, particularly by means of a model of the motor, will now be described.

In the Park frame of reference, which comprises three axes denoted d, q and f, a power train comprising a synchronous motor is governed by the following equations:

$$V_d = R_s \cdot I_d + L_d \frac{dI_d}{dt} + M_f \cdot \frac{dI_f}{dt} - \omega_r \cdot L_q \cdot I_q \quad \text{(Eq. 1)}$$

$$V_q = R_s \cdot I_q + L_q \cdot \frac{dI_q}{dt} + \omega_r(L_d \cdot I_d + M_f \cdot I_f)$$

$$V_f = R_f \cdot I_f + L_f \cdot \frac{dI_f}{dt} + \alpha \cdot M_f \cdot \frac{dI_d}{dt}$$

With:
$V_d$: control signal of the electric motor along the d axis
$V_q$: control signal of the electric motor along the q axis
$V_f$: control signal of the electric motor along the f axis
$L_d$: Equivalent armature inductance along the d axis.
$L_q$: Equivalent armature inductance along the q axis.
$L_f$: Inductance of the rotor.
$R_s$: Equivalent resistance of the stator windings.
$R_f$: Resistance of the rotor.
$M_f$: Mutual inductance between the stator and the rotor.
$I_d$: Current along the d axis.
$I_q$: Current along the q axis.
$I_f$: Current along the f axis.
a: Power conservation constant in the Park transformation, for example equal to 1 or 1.5.
$\omega_r$: Rotational velocity of the magnetic field of the machine in rad/s (for a synchronous machine, this is equal to the rotational velocity of the rotor multiplied by the number of pairs of poles of the machine).

In order to simplify the solving of these equations to supply the minimum and maximum current value bounds, these equations can be re-written in steady state, i.e. considering that the derivative terms are zero in the equation Eq. 1. Each current can thus be expressed as a function of the control signals and the velocity:

$$\bar{I}_d = \frac{R_S}{R_S^2 + \omega^2 L_d L_q} \bar{V}_d + \frac{\omega L_q}{R_S^2 + \omega^2 L_d L_q} \bar{V}_q - \frac{\omega^2 L_q M_f}{R_f(R_S^2 + \omega^2 L_d L_q)} \bar{V}_f \quad \text{(Eq. 2)}$$

$$\bar{I}_q = \frac{\omega L_d}{R_S^2 + \omega^2 L_d L_q} \bar{V}_d + \frac{R_s}{R_S^2 + \omega^2 L_d L_q} \bar{V}_q -$$

$$\frac{\omega^2 R_s M_f}{R_f(R_S^2 + \omega^2 L_d L_q)} \bar{V}_f$$

$$\hat{I}_f = \frac{1}{R_f} \bar{V}_f$$

These equations can be rewritten by grouping certain terms:

$$\bar{I}_d = G_{d/d}\bar{V}_d + G_{d/q}\bar{V}_q + G_{d/f}\bar{V}_f$$

$$\bar{I}_q = G_{q/d}\bar{V}_d + G_{q/q}\bar{V}_q + G_{q/f}\bar{V}_f$$

$$\bar{I}_f = G_{f/f}\bar{V}_f \quad \text{(Eq.3)}$$

Furthermore, it is possible to know the various parameters of a motor or a machine by implementing calibration steps or tests, which make it possible to obtain the minimum and maximum values of these parameters (which can in particular depend on the temperature). Minimum and maximum values are then obtained for each parameter denoted $G_{x/x}$ (with x chosen among d, q and f). These values can therefore supply, for all control signal values and at any moment, the minimum and maximum current bounds. The comparison step E30 can thus be implemented.

Figure 2:
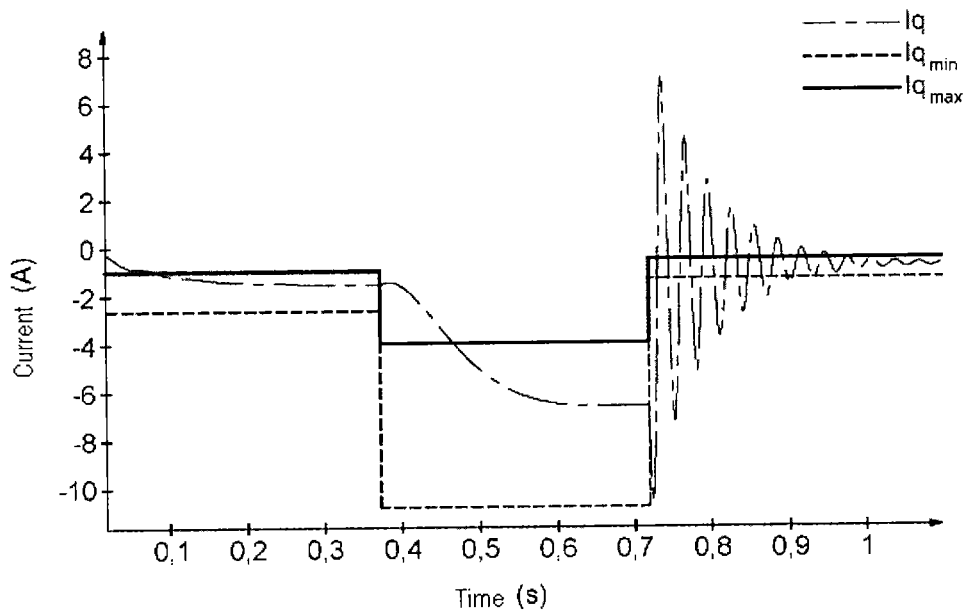
FIG. 2 illustrates the result of a first variant according to a method of implementation and embodiment of the invention.

FIG. 2 represents an example of the evolution of the current $I_q$ surrounded by its minimum and maximum bounds $I_{qmin}$ and $I_{qmax}$. Note that, in the steady periods at least (for example the periods during which the control signals do not vary), the signal $I_q$ does indeed lie between the two bounds. A measurement of a value outside these bounds can for example indicate a fault in a sensor.

Another variant of the invention well-suited to unsteady states will now be described, specifically with reference to FIGS. 3 to 5.

Figure 3:
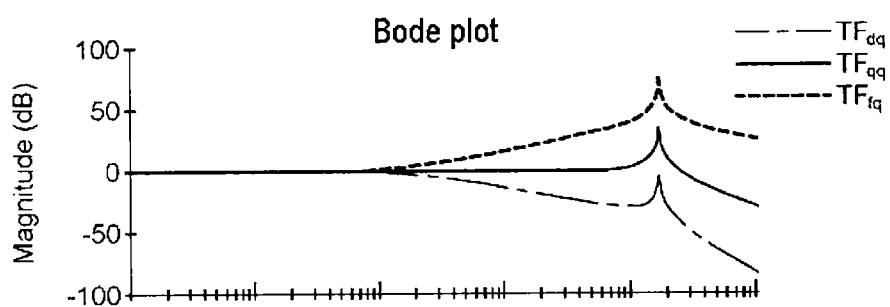
FIGS. 3 to 5 illustrate the result of a second variant according to a method of implementation and embodiment of the invention.

FIG. 3 represents the normalized transfer functions between each control signal and the current $I_q$, i.e. the main current intended to supply the torque. More precisely, it represents the transfer function between the control signal $V_d$ and the current $I_q$ (denoted $TF_{dq}$), the transfer function between the control signal $V_q$ and the current $I_d$ (denoted $TF_{qq}$) and the transfer function between the control signal $V_f$ and the current $I_q$ (denoted $TF_{fq}$). These transfer functions are obtained by means of the equation Eq. 1.

In order to obtain minimum and maximum bounds of the current, on the basis of FIG. 3, it is possible to choose two functions (or filters) capable of enveloping these curves. Second-order functions may be chosen, for example. Furthermore, it is possible to choose a so-called slow filter, i.e. with a gain below the transfer functions for all frequencies, and a so-called fast filter, i.e. with a gain above the transfer functions for all frequencies.

By way of non-limiting example, the following filters denoted Fl (slow filter) and Fr (fast filter) may be chosen:

$$Fr = k + (1-k)z^{-1} \quad \text{(Eq. 4)}$$

$$Fl = \frac{a}{1+(a-1)z^{-1}}$$

With:

a, k: parameters to be determined z: discrete element

Figure 4:
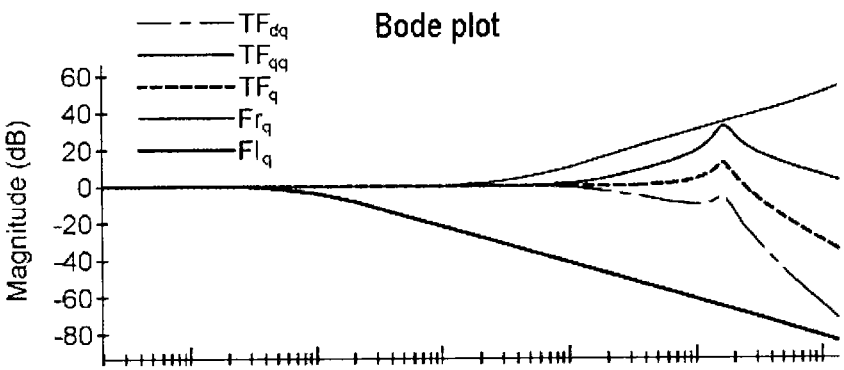

By implementing calibration steps, for the main current $I_q$, it is possible to obtain a and k parameter values giving frequency responses such as those illustrated in FIG. 4. This figure represents the transfer functions $TF_{dq}$, $TF_{qq}$ and $TF_{fq}$ already represented in FIG. 3, and the transfer functions of the slow filter (denoted Flq) and of the fast filter (denoted Frq) are represented. A smaller and a larger envelope are indeed obtained for all frequencies.

Although two different parameters are used here, it is perfectly possible to use only a single parameter in order to simplify the calibration steps and limit information storage.

Note that it is preferable to determine a and k for each voltage for one of the currents. For example, for the current $I_q$, six tables can be provided, among which three contain values of a (one for each control signal) and three contain values of k (one for each control signal). The various values in each table may be determined for different velocities.

It should be noted that in order to facilitate the calibration steps, the transfer functions can be written using the Laplace transform (with a variable denoted s) as indicated hereinafter:

$$\frac{I_q}{V_d} = \frac{-\omega(L_d R_f + (L_d L_f - \alpha M_f^2)s)}{\text{Den}} \quad \text{(Eq. 5)}$$

$$\frac{I_q}{V_q} = \frac{(R_s + L_d s)(R_f + L_f s)}{\text{Den}}$$

$$\frac{I_q}{V_f} = \frac{-\omega M_f (R_s + L_d s)}{\text{Den}}$$

With:

$$\text{Den} = R_f(R_f^2 + \omega^2 L_d L_q) +$$
$$(\omega^2 L_q (L_d L_f - a M_f^2) + R_f R_s (L_d + L_q) + L_f R_s^2)s +$$
$$(L_d L_q R_f + L_f R_s (L_d + L_q))s^2 + L_d L_q L_f s^3$$

It is then possible to determine a correct value for the parameter k by computing the gains of the transfer functions of the equation Eq. 5, particularly at the frequency ω for which a peak is obtained in FIGS. 3 and 4, this frequency being able to be determined by calibration. Furthermore, a correct value can be obtained for the parameter a by determining the gain for zero w.

Slow and fast filters forming envelopes for all possible frequencies are thus obtained. It is furthermore possible to track the variations of the current with these filters. For example, if the desired value for the current is above the measured value, it is advisable to use the so-called fast filter, in order to supply a bound that is always above the measured level. If, on the contrary, the desired value for the current is below the measured value, it is necessary to prevent the bound from decreasing more quickly than the current, and the slow filter is then applied: the bound thus decreases more slowly than the current.

By way of example, the application of the filter (which is a digital filter) can therefore be as follows:

$$s[n] = \begin{cases} ae[n] + (1-a)s[n-1] & \text{si } e[n] < s[n-1] \\ ke[n] + (1-k)e[n-1] & \text{si } e[n] > s[n-1] \end{cases} \quad \text{(Eq. 6)}$$

In the equation Eq. 6, e represents the input data, s the filter output data.

Figure 5:
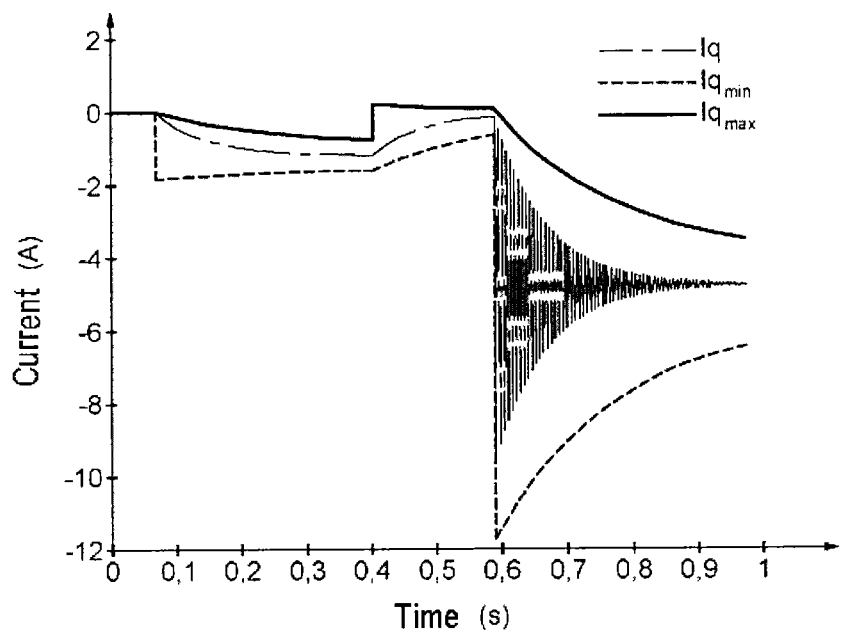

Bounds are thus obtained such as those illustrated in FIG. 5, for which the current $I_q$ is surrounded by the envelopes $I_{qmin}$ and $I_{qmax}$ which vary in the same way as the current. Note that the current $I_q$ never crosses the bounds, which corresponds to a correct operation of the sensors.

Note that the two variants described previously are particularly suitable for being embedded into a power train control system. Indeed, these control systems generally comprise computing means of microprocessor type with limited computing and memory capabilities.

The invention claimed is:

1. A method for controlling a power train equipping a motor vehicle and comprising an electric motor equipped with a rotor and a stator, said method comprising:

regulating currents of the rotor and the stator providing voltage control signals for the electric motor, said currents to be regulated and said voltage control signals being expressed in a rotating frame of reference comprising a plurality of axes, measuring values of the currents of the rotor and the stator;

transforming the measured values of the currents into said rotating frame of reference comprising the plurality of axes;

calculating, via a microprocessor, minimum and maximum bounds for each of the currents as a function of said voltage control signals without using the currents in the calculating of the minimum and maximum bounds, the minimum and maximum bounds for each of the currents indicating a range in which the current must lie when the voltage control signals are applied;

comparing the transformed measured values of the currents with said minimum and maximum bounds; and limiting, via the microprocessor, the voltage control signals applied to the rotor and the stator when a result of the comparing is that the transformed measured values of the currents are not within said minimum and maximum bounds.

2. The method as claimed in claim 1, wherein the calculation of the minimum and maximum bounds is implemented by a model of the motor.

3. The method as claimed in claim 2, furthermore comprising, prior to the calculating the minimum and maximum bounds, solving equations of the model of the motor in steady state comprising a calibration step.

4. The method as claimed in claim 1, furthermore comprising, prior to the calculation of the minimum and maximum bounds, determining transfer functions setting the current values for each control signal and determining functions enveloping said transfer functions depending on parameters, said parameters being determined by calibration.

5. A device that controls a power train equipping a motor vehicle and comprising an electric motor equipped with a rotor and a stator, the device comprising:

means for regulating the currents of the rotor and the stator providing voltage control signals for the electric motor, said currents to be regulated and said voltage control signals being expressed in a rotating frame of reference comprising a plurality of axes, sensors that measure values of the currents of the rotor and the stator; and a microprocessor configured to:

transform the measured values of the currents into said rotating frame of reference comprising the plurality of axes;

calculate minimum and maximum bounds for each of the currents as a function of said voltage control signals without using the currents in the calculating of the minimum and maximum bounds, the minimum and maximum bounds for each of the currents indicating a range in which the current must lie when the voltage control signals are applied; and compare the transformed measured values of the currents with said minimum and maximum bounds, wherein the means for regulating limits the voltage control signals applied to the rotor and the stator when a result of the comparing is that the transformed measured values of the currents are not within said minimum and maximum bounds.

6. The device as claimed in claim 5, wherein the microprocessor includes a model of the motor to calculate the minimum and maximum bounds.

7. The device as claimed in claim 6, wherein the microprocessor is configured to solve a set of equations of the model of the motor in steady state.

8. The device as claimed in claim 5, wherein the microprocessor is configured to calculate transfer functions setting the current values for each control signal and to determine functions enveloping said transfer functions depending on parameters.

9. The method as claimed in claim 4, wherein the parameters on which the functions enveloping said transfer functions depend include two parameters for each voltage for one of the currents.

10. The device as claimed in claim 8, wherein the parameters on which the functions enveloping said transfer functions depend include two parameters for each voltage for one of the currents.

* * * * *